United States Patent [19]
Srivastava et al.

[11] Patent Number: 5,571,451
[45] Date of Patent: Nov. 5, 1996

[54] QUANTUM SPLITTING OXIDE PHOSPHOR AND METHOD OF MAKING

[75] Inventors: Alok M. Srivastava, Schenectady, N.Y.; William W. Beers, Chesterland, Ohio

[73] Assignee: General Electric Company, Schenectady, N.Y.

[21] Appl. No.: 367,637

[22] Filed: Jan. 3, 1995

[51] Int. Cl.$^6$ ................................................ C09K 11/64
[52] U.S. Cl. .................. 252/301.4 R; 423/600; 423/263; 313/486
[58] Field of Search .............. 252/301.4 R; 423/600, 423/263; 501/127, 153, 152, 120; 313/486

[56] References Cited

U.S. PATENT DOCUMENTS

| | | |
|---|---|---|
| 4,150,321 | 4/1979 | Schetters et al. ............. 252/301.4 R |
| 4,246,630 | 1/1981 | Wolfe ............................ 252/301.4 R |
| 5,140,604 | 8/1992 | Alablanche et al. .................. 372/41 |

OTHER PUBLICATIONS

Alablanche et al, "Tunable Laser Effect in ASN: A Neodymium–Activated Strontium–Magnesium Hexaaluminate", Jour. de Phy. IV, C7, vol. 1, Dec. 1991; 275–78.

*Primary Examiner*—Melissa Bonner
*Attorney, Agent, or Firm*—Noreen C. Johnson; William H. Pittman

[57] ABSTRACT

A quantum splitting oxide phosphor is described for use with VUV radiation. The oxide material has an atomic ratio, comprising: $Sr_{1-x}Pr_xAl_{12-x}Mg_xO_{19}$; where $0<X\leq 0.20$. The material is stable and compatible for use as a phosphor with VUV radiation created by Hg vapor discharge.

8 Claims, 2 Drawing Sheets

QUANTUM SPLITTING OXIDE PHOSPHOR AND METHOD OF MAKING

FIELD OF THE INVENTION

This invention relates generally to a new oxide material, that has one application as a phosphor. More specifically, it comprises an oxide phosphor doped with $Pr^{3+}$ that exhibits quantum splitting when irradiated with VUV (Vacuum Ultra-Violet) radiation. Most specifically, it is a composition of matter of the form $Sr_xPr_{1-x}Al_{12-x}Mg_xO_{19}$, where $0<X\leq 0.20$, and a method of making this oxide.

BACKGROUND OF THE INVENTION

The conversion of a single ultraviolet photon into two visible photons with the result that the quantum efficiency of luminescence exceeds unity is termed quantum splitting. Quantum splitting materials are very desirable for use as phosphors for lighting applications, such as fluorescent lamps. A suitable quantum splitting material can in principle produce a significantly brighter light source. Quantum splitting has been demonstrated previously in fluoride-base materials. A material comprising 0.1% $Pr^{3+}$ in a matrix of $YF_3$ has been shown to generate more than one visible photon for every absorbed UV photon when excited with 185 nm radiation. The measured quantum efficiency of this material was 145%±15%, and thus greatly exceeded unity. The critical conditions that yield quantum splitting by the $Pr^{3+}$ ion have only been achieved in fluoride-base materials. However, fluoride-base compounds do not have sufficient stability to permit their utilization as a phosphor in fluorescent lamps, because they are known to react with the Hg vapor that is used in such lamps to provide the UV radiation and form a material that does not exhibit quantum splitting.

Therefore, it is desirable to develop materials that exhibit quantum splitting behavior, but that are also stable and suitable for use in current technology lamps (e.g. Hg-containing fluorescent lamps), such as metal oxides.

SUMMARY OF THE INVENTION

This invention comprises an oxide phosphor doped with $Pr^{3+}$ that exhibits quantum splitting when irradiated with VUV radiation. It features the desired characteristic of being chemically stable in the presence of an Hg vapor discharge.

This invention comprises a composition of matter in the form of an oxide material having an atomic ratio, comprising: $Sr_{1-x}Pr_xAl_{12-x}Mg_xO_{19}$; where $0<X\leq 0.20$.

The invention may also be described as an oxide of aluminum, strontium, praseodymium and magnesium that exhibits quantum splitting when excited by VUV radiation.

The invention also may be described as a method of making $Sr_{1-x}Pr_xAl_{12-x}Mg_xO_{19}$ material, where $0<X\leq 0.20$, comprising the steps of: selecting a desired value of X so as to define a desired composition; forming a substantially homogeneous mixture from a quantity of each of the compounds $SrCO_3$, $Pr_6O_{11}$, $Al(OH)_3$ and MgO that is sufficient to satisfy a stoichiometric requirement of the desired composition; and firing the mixture in a non-oxidizing atmosphere at a temperature and for a time sufficient to sinter the material and maintain the Pr state as $Pr^{3+}$.

Other benefits of this invention may be apprehended by reviewing the description and appended claims.

DETAILED DESCRIPTION OF THE INVENTION

Figure 1:
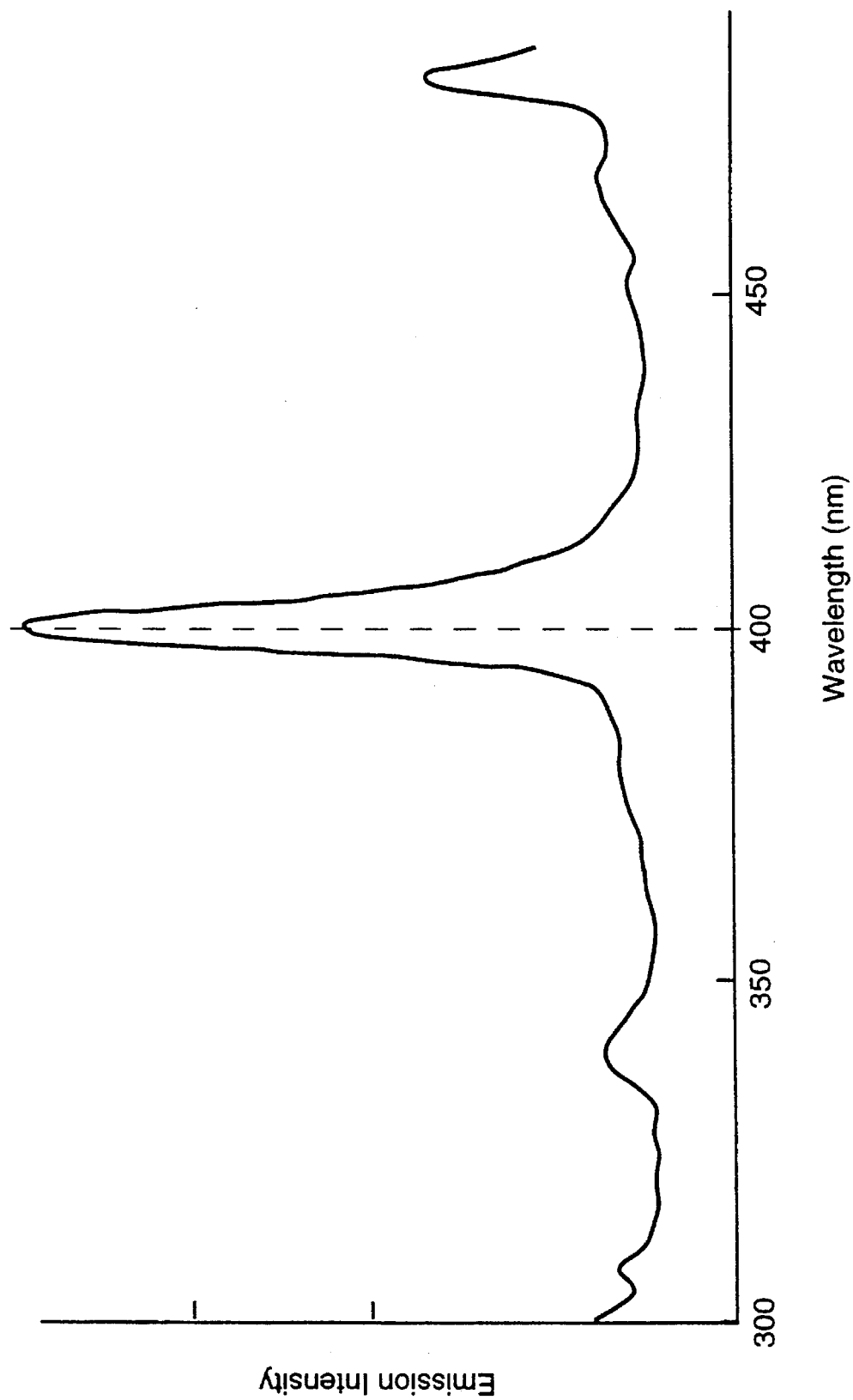
FIG. 1 is a plot of measured values of emission intensity as a function of wavelength for a phosphor of the present invention.

This invention relates generally to a new oxide material comprising a complex oxide of aluminum, strontium, magnesium and praseodymium. This material may be used as a phosphor, and is of particular interest because it has been observed to exhibit quantum splitting when it is excited by UV radiation in a VUV radiation environment. This material was empirically determined to be a quantum splitting material based upon observation of a characteristic peak or shift in the emission spectra of the material at 400 nm when excited by VUV radiation, as shown in FIG. 1. This shift at 400 nm is known to be a characteristic of quantum splitting materials, and examination of the intensity/wavelength emission spectra provides a convenient way of testing phosphors for quantum splitting behavior, as opposed to using the more time consuming quantum efficiency measurements for this purpose.

Review of intensity/wavelength emission spectra for a number of complex oxides of aluminum, strontium, magnesium and praseodymium has led to the empirical determination that quantum splitting is particularly observed in oxides of the present invention over the range of compositions represented by the atomic ratios:

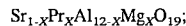

$Sr_{1-x}Pr_xAl_{12-x}Mg_xO_{19}$;

where $0<X\leq 0.20$.

Without limitation, the quantum splitting behavior is attributed to the UV excitation of the $Pr^{3+}$ ion within the oxide lattice. Therefore, oxides of the present invention should be processed so as to maintain Pr as a $Pr^{3+}$ ion within the oxide lattice An oxides of this invention within the range of compositions described above has been incorporated into a VUV fixture containing Hg, which was excited to serve as the UV source. The oxides of this invention continued to exhibit quantum splitting, even after about 100 hours of exposure to the Hg.

Figure 2:
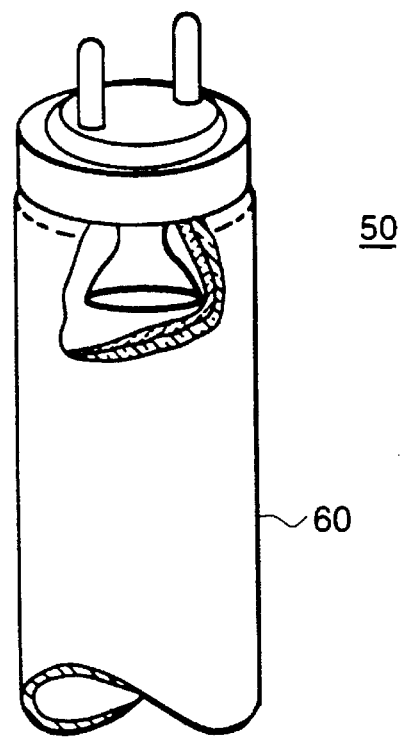
FIG. 2 is a schematic illustration of a lamp incorporating a phosphor of the present invention.
Figure 2:
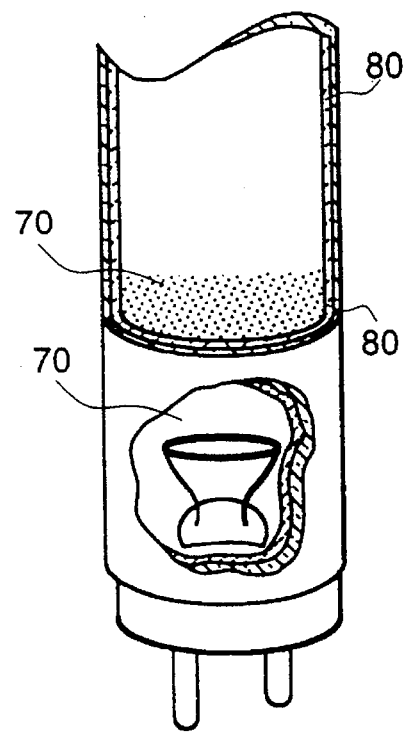

An oxide of the present invention characterized by quantum splitting behavior in VUV radiation and stability with regard to an Hg discharge environment may be utilized as a phosphor in a fluorescent lamp. Referring to FIG. 2, lamp 50 comprises an evacuated housing means 60, a VUV radiation source 70 located within the housing means 60, and a phosphor 80 that is located within the housing and adapted to be excited by the VUV radiation source, said phosphor 80 comprising an oxide of aluminum, strontium, praseodymium and magnesium that exhibits quantum splitting when excited by VUV radiation. In a preferred embodiment, lamp 50 is a fluorescent lamp and evacuated housing means 60 comprises an evacuated glass tube. The VUV radiation source 70 is a combination of Hg and an excitation means located within the glass tube that may be used to create an Hg vapor discharge to excite phosphor 80.

EXAMPLE 1

A sample of the oxide of the present invention designed to yield 50 grams of the final material was prepared by combining the following:

| | |
|---|---|
| $SrCO_3$ | 9.77 g |
| $Pr_6O_{11}$ | 0.59 g |
| $Al(OH)_3$ | 64.94 g |
| MgO | 0.14 g |

The starting materials were blended using a ball mill with $ZrO_2$ milling media. The blended materials were then fired in air in an available furnace for 5 hours at 1,500° C. to sinter the material, however, firing in air is generally undesirable because it tends to oxidize the Pr to $Pr^{4+}$, rather than $Pr^{3+}$. Therefore, in this example, the sintered sample was remilled and fired at 1,200° C. for an additional 5 hours in forming gas (1% $H_2$–99% $N_2$) to reduce the Pr to $Pr^{3+}$. The final composition of the material was $Sr_{0.95}Pr_{0.05}Al_{11.95}Mg_{0.05}O_{19}$.

A general method for making the oxides of the present invention comprises selecting 100 a desired value of X so as to define a desired composition; forming 110 a substantially homogeneous mixture from a quantity of each of the compounds $SrCO_3$, $Pr_6O_{11}$, $Al(OH)_3$ and MgO that is sufficient to satisfy a stoichiometric requirement of the desired composition; and firing the mixture in a non-oxidizing atmosphere at a temperature and for a time sufficient to sinter the material and maintain the Pr state as $Pr^{3+}$.

The material was irradiated with 185 nm radiation in a VUV instrument. The resulting emission was monitored from 300–500 nm, and is shown as FIG. 1. In addition to the shift at 400 nm, a shift was also observed in the visible spectrum at approximately 480 nm.

What is claimed is:

1. An oxide phosphor comprising Sr, Al and Mg as constituents of the oxide, having an oxide lattice that is doped with $Pr^{+3}$, said oxide phosphor adapted to exhibit quantum splitting behavior in the oxide lattice when irradiated by a source of VUV radiation.

2. A method of making $Sr_{1-X}Pr_XAl_{12-X}Mg_XO_{19}$ material that exhibits quantum splitting behavior, where $0<X\leq0.20$, comprising the steps of:

selecting a value of X so as to define a composition;

forming a substantially homogeneous mixture from a quantity of each of the compounds $SrCO_3$, $Pr_6O_{11}$, $Al(OH)_3$ and MgO that is sufficient to satisfy a stoichiometric requirement of the composition; and firing the mixture in a non-oxidizing atmosphere at a temperature and for a time sufficient to sinter the mixture and form a material having a composition comprising $Sr_{1-X}Pr_XAl_{12-X}Mg_XO_{19}$, where $0<X\leq0.20$, and Pr is in a state as $Pr^{3+}$, wherein the material exhibits quantum splitting behavior when excited by VUV radiation.

3. The method of claim 2, wherein the non-oxidizing atmosphere is a forming gas atmosphere.

4. A lamp comprising an evacuated housing, a VUV radiation source located within the housing, and a phosphor that is located within the housing and adapted to be excited by the VUV radiation source, said phosphor comprising an oxide of aluminum, strontium, praseodymium and magnesium that exhibits quantum splitting when excited by VUV radiation.

5. The lamp of claim 4, wherein the phosphor comprises $Sr_{1-X}Pr_XAl_{12-X}Mg_XO_{19}$, where $0<X\leq0.20$.

6. The lamp of claim 5, wherein the VUV radiation source is Hg that is adapted to be excited by an excitation means so as to create an Hg vapor discharge.

7. The oxide phosphor of claim 1, wherein the oxide comprises a composition represented by $Sr_{1-X}Pr_XAl_{12-X}Mg_XO_{19}$, where $0<X\leq0.20$.

8. The oxide phosphor of claim 1, wherein the VUV radiation results from a Hg vapor discharge in the presence of the oxide phosphor.

* * * * *